United States Patent [19]

Tuttle

[11] Patent Number: 4,676,092

[45] Date of Patent: Jun. 30, 1987

[54] FILTER TEST METHOD AND APPARATUS

[76] Inventor: Wainwright Tuttle, 5992 Kenwood Rd., Madeira, Ohio 45243

[21] Appl. No.: 779,815

[22] Filed: Sep. 25, 1985

[51] Int. Cl.[4] .............................................. G01M 3/24
[52] U.S. Cl. ..................................... 73/38; 73/40.5 A
[58] Field of Search .................. 73/38, 40, 40.5 A, 37, 73/432 SP, 40.7; 55/274, 270

[56] References Cited

U.S. PATENT DOCUMENTS

| | | | |
|---|---|---|---|
| 2,072,872 | 3/1937 | Finkelstein | 73/38 |
| 2,833,140 | 5/1958 | Austen et al. | 73/38 |
| 3,369,346 | 2/1968 | Wildbolz et al. | 55/274 |
| 3,608,379 | 9/1971 | Brevko et al. | 73/38 |
| 3,614,421 | 10/1971 | Alter | 55/274 |
| 3,960,001 | 6/1976 | Hayes | 73/38 |
| 4,213,768 | 7/1980 | Bauman et al. | 73/38 |
| 4,249,655 | 2/1981 | Patureau et al. | 73/432 PS |
| 4,382,378 | 5/1983 | Wadsworth et al. | 73/38 |
| 4,402,214 | 9/1983 | Morgan et al. | 73/38 |

FOREIGN PATENT DOCUMENTS

| | | | |
|---|---|---|---|
| 46740 | 3/1982 | European Pat. Off. | 73/38 |
| 660107 | 4/1938 | Fed. Rep. of Germany | 73/38 |

OTHER PUBLICATIONS

Langer, "A Further Development of Acoustic Particle Counter", Technical Meeting and Exhibit, Mar. 1966.
Status of Acoustic Particle Counter Research, Power Technology, 2(1968/69), 307-308.
G. Langer, "An Acoustic Particle Counter-Preliminary Results, Journal of Colloid Science, 20, 602-609, 1965.

*Primary Examiner*—Stewart J. Levy
*Assistant Examiner*—Hezron E. Williams
*Attorney, Agent, or Firm*—Frost & Jacobs

[57] ABSTRACT

The invention consists of a method and apparatus for very rapid, assembly-line inspection of fluid filters for manufacturing flaws; which, when the filter is in service, would pass particles harmful to the mechanism or device which the filter is designed to protect. A harmless and low-cost particle test agent, with a wide range of particle sizes, is blown into the filters. If particles of a size which would be potentionally harmful in service, because of their relatively large size, pass through the filter along with the harmless small particles, they are concentrated in the air stream by a cyclone. The particles and the small remaining stream of air, then enter an acoustic sensor which signals rejection of the filter, because it will signal only the larger, potentially harmful particles.

4 Claims, 2 Drawing Figures

FILTER TEST METHOD AND APPARATUS

This invention relates broadly to the testing of fluid filters, and more particularly to the testing of pleated paper filter elements and complete filters for quality control.

Filter elements normally require a very large surface area both to permit a free flow of fluid through them and to permit the accumulation of a large quantity of foreign matter without restricting the flow excessively.

The normal range of pore sizes in a filter is such that foreign particles larger than a certain size cannot pass through. If flaws are present in the filter and they are much larger than the normal pore size range, large particles can pass through and render the filter ineffective for its purpose.

Various means are employed to test filters for such flaws; such as duplication, on a test basis, of the pertinent conditions encountered in actual use in the field. However, these method are lengthy; and, therefore, can be employed only on a small sample of actual production.

Since there are many sources of various types of flaws in actual production, the only effective method of rejecting those filters which will pass harmful particles, is a 100% test. This requires that the test keep pace with production.

The most common present method of 100% inspection of filter elements for such manufacturing flaws is to place a light inside and inspect visually from the outside for any light showing directly through the pleated paper. This method cannot detect flaws wherein the leakage path for large particles is not almost a straight line from the light to the eye of the inspector. A better method of 100%-inspection for such flaws has long been needed by the filter industry. One which gives an immediate signal indicating the presence of the smallest rejectable flaw will be very valuable for the production of dependable filters.

It is, therefore, a principal object of this invention to provide a method and apparatus for testing pleated paper fluid filters and filter elements, or other types of filters and filter elements, for all flaws which can pass harmful particles, and test very rapidly.

It is a further object of this invention to provide a method and apparatus for testing pleated paper fluid filters and filter elements for all rejectable flaws down to the smallest.

It is a further object of this invention to provide a method and apparatus to test pleated paper fluid filters and filter elements 100% at low cost by keeping up with high production assembly.

It is a further object of this invention to provide a method and apparatus for testing filters and filter elements which does not employ liquids which may affect the properties of the filtering material, and does not require drying them out after testing.

Described briefly, according to one embodiment of my invention, a filter is enclosed in a chamber, and air containing a large range of particle sizes of a harmless test agent is blown through it. If large particles pass through, this this indicates the presence of a flaw or flaws. The air carrying the particles, which have passed through, then enters a cyclone which removes most of the air flow. The particles, carried by the remaining small air flow, enter a sensor; which, under the influence of a low-vacuum pump drawing air through it, permits each large particle to create a shock wave which produces a sharp audible click. A microphone senses the clicks and converts the sound to electrical pulses, which are electronically processed to determine by visual display whether it exceeds a predetermined acceptable standard for flaws in the filter. The process is suitable for 100%-inspection of high production filters on the assembly line, superceding present relatively ineffective 100%-inspection methods. The co-relation with 8-hour, laboratory sampling tests of filters from the production line is excellent. The test can be fully automated, and it is sufficiently simple and reliable to permit operation and maintenance under a wide range of high-production factory floor conditions.

Although the method and apparatus of this invention does not detect the location of flaws so that repetitive faults may be traced to their cause and eliminated, a simple, rapid test of the flawed filters, which have been put aside by the method and apparatus of this invention, may be employed to locate the flaws, using water or other liquids and based on the common bubble test, but also providing a rapid, semi-automatic test at low cost. This non-destructive liquid test is described in my U.S. Pat. No. 3,336,793, *Filter Test Method and Apparatus.* The equipment may also be used as a more rapid test, without locating the flaws, for 100%, production-line inspection if the use of liquid is permissable.

The full nature of the invention will be understood from the accompanying drawings and the following description and claims.

Figure 1:
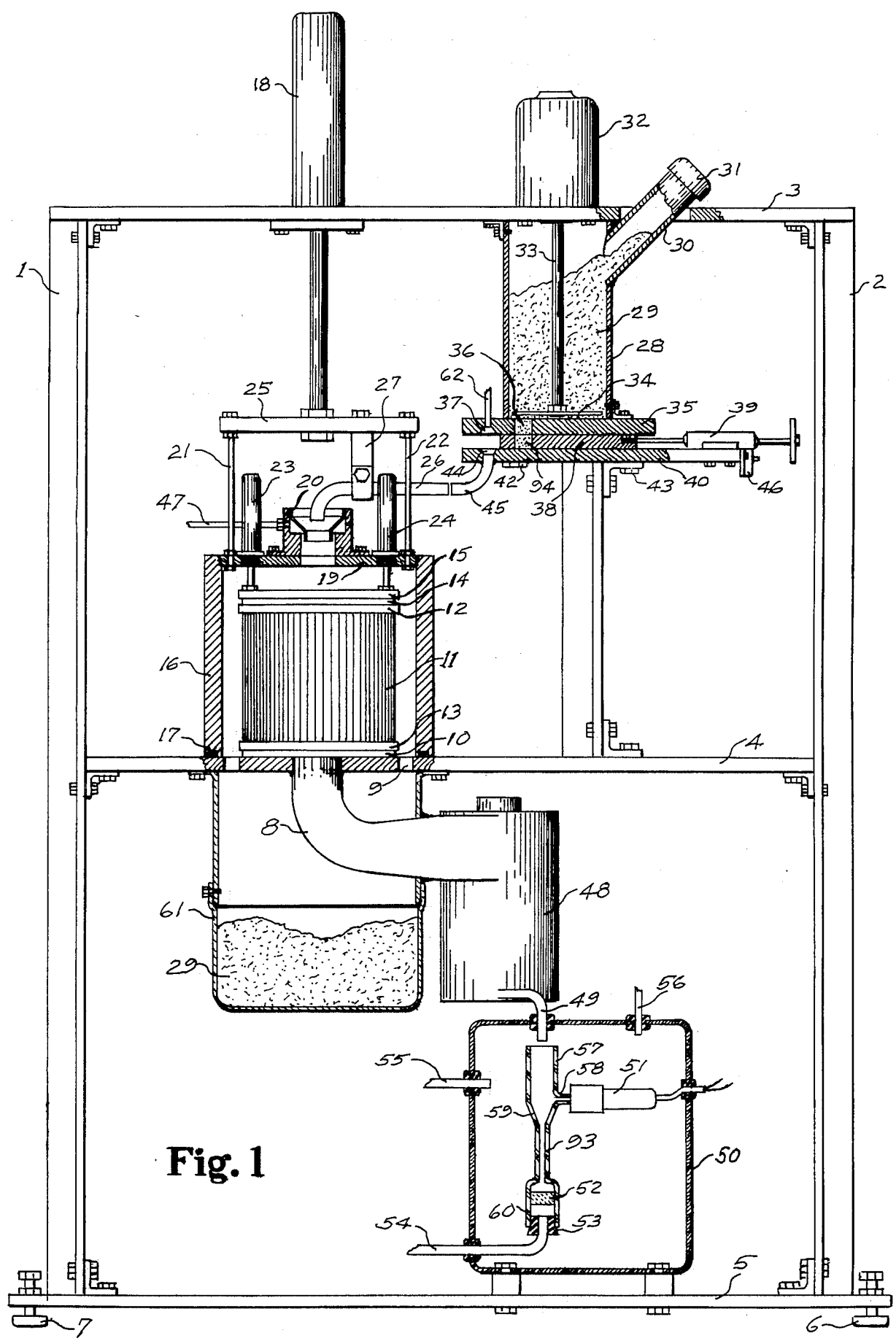
FIG. 1 is a front elevational view of the apparatus, including sectioned portions to reveal the construction where necessary.

Referring now to the drawings in detail, the apparatus shown in FIG. 1 is provided with a frame consisting of vertical side members 1 and 2, mounting plates at the top 3, the middle 4, and the bottom 5. Two adjustable feet 6 and 7 are secured to the bottom plate 5. The middle mounting plate 4 is also a work surface. This plate contains a relatively large hole into which is soldered a tubing elbow 8. In a circle around and spaced from this hole are openings 9 forming a circle of some width, except for narrow radial ribs interrupting the circle as supports for the more central portion of the plate around the hole. To this portion is bonded a gasket 10 containing a central hole aligning with the top of the elbow 8. Resting on this gasket is the filter element to be tested. At the top of the pleated paper cylinder 11 is an end plate 12 which may or may not have a hole. This end plate and the bottom end plate 13 are bonded and sealed to the upper and lower ends of the paper pleats respectively. The lower end plate has a hole which aligns with the hole in gasket 10 and the top of elbow 8. This described complete filter element has been placed manually, resting on the gasket 10 in proper alignment, maintained by a short sleeve (not shown) projecting up from the elbow 8.

On the top of the filter element is a pressure plate 15 to which is bonded a gasket 14 which will, in operation, bear on the top of the filter element, sealing the bottom end plate 13 to the gasket 10 and sealing the top end plate 15 of the filter (if it contains a hole) to gasket 14.

A cylindrical chamber 16 encloses the filter, being sealed to the mounting plate 4 with an O-ring 17 under the force exerted by air cylinder 18, mounted on the top plate 3 of the machine frame. This air cylinder is secured to the top plate 19 of the cylindrical chamber by means of plate 25 and rods 21 and 22, it also raises the chamber to permit loading and unloading of the filter. Mounted on the top plate 19 are smaller air cylinders 23 and 24 which are secured to the pressure plate 15 to provide the force to seal the filter element between this pressure plate 15 with its gasket 14 and the mounting plate 4 with its gasket 10.

Also mounted on the top plate 19 of the cylindrical chamber is a commercially available transvector 20, an air-flow-amplifying device; which, by an action based on the Bernouli effect, induces a large air flow at low pressure from a small air flow at high pressure. A tube 26 is disposed over and close to the top entry to the transvector 20 and supported by the bracket 27. Its purpose is described below.

Mounted on the top plate 3 of the machine frame is a cylindrical reservoir 28 which is periodically refilled with the test agent in powdered form 29. This agent may be one of several suitable materials with the proper properties. These properties include free-flowing, unaffected by humidity, the proper range of particle size and shape, non-abrasive, a low specific gravity for suspension in a turbulent air stream, a distinctive color and low cost. For example, a test agent meeting these requirements is commercial 100-mesh, English-walnut-shell flour. However, in a few cases there appears to be an objection to blowing off the slight residue of harmless agent from the pleats, and its remaining on them if the product when tested is already enclosed in a shell or can.

For these cases a special agent can be used; which, in a few days after testing, disappears by subliming to a gas. The agent is powdered ammonium carbonate. However, this agent is more costly, and its necessary treatment immediately before use requires an added investment in equipment and somewhat higher expense for maintenance of both the treatment equipment and the test equipment.

An alternative test agent to the English-walnut-shell flour which does not require special treatment before use like the above ammonium carbonate, is a white powder which is produced for thermal cladding. Its higher specific gravity, however, reduces somewhat the ease of suspending it in an air stream, so that the sensitivity of the system is slightly reduced.

An inclined side entry tube 30 with a screw cap 31 is affixed to the reservoir 28 for replenishing the test agent 29. Mounted on the top plate 3 of the machine frame above the reservoir 28 is an electric motor 32 carrying a shaft 33 fitted with a beater 34 positioned over and slightly spaced from a plate 35 which forms the bottom of the reservoir 28. In this plate 35 are two holes 36 and 37 not counting mounting-bolt holes. Hole 36 aligns with a similar hole 94 in a slider plate 38 which moves under the action of air cylinder 39 between alignment of hole 94 with hole 36 in plate 35 and alignment with hole 44 in plate 40. Slider plate 38 is contained with a close sliding fit between plate 35 and plate 40. Plate 40 is supported by column 41 and is secured by bolts 42 and 43 to plate 35. These bolts carry spacer collars (not shown) which maintain the close sliding fit of slider plate 38. Beater 34 agitates the test agent 29 causing it to fill hole 36 and hole 94 with test agent.

Before the test agent 29 is injected to test the filter element 11, a valve 73 (FIG. 2) from normal factory line air pressure of 80 to 100 PSI, cleaned by filter trap 63 (FIG. 2), opens, delivering air through conduits 94 and 95 (FIG. 2) through fine filter 77 (FIG. 2) and conduit 47 (FIG. 2) to transvector 20. This induces a very high flow of additional air from atmosphere 96 (FIG. 2) to pass through the filter element 11 and the rest of the system. This high flow purges the system of any remaining test particles from the previous test cycle, any paper fibers or other large particles from the filter to be tested, and any large foreign particles from the system before the electronic flaw-measuring and readout system is activated.

Following the purging of the system, air cylinder 39 advances slider plate 38 until hole 94 registers with hole 44 in plate 40, allowing an air blast from tube 62, activated by limit valve 46, through metering hole 94 in plate 38 to drive the small measured quantity of agent from hole 94 into tubular elbow 45. The air and agent then enter tube 26, none leaking out of the spaced alignment between elbow 45 and tube 26, because of the Bernouli effect. Tube 26 carries the air and agent into transvector 20 where they mix with a larger flow of air from atmosphere 96 (FIG. 2) induced by factory line air pressure, reduced to the proper level by air pressure regulator 74 (FIG. 2) somewhat below the full line air pressure into the transvector 20, which was employed for purging. The reduced air pressure, which avoids dislodging more fibers or particles in the system, enters the transvector through tube 47. Turbulence now mixes the air and particles, which then enter the test chamber and descend into the space between the exterior of the filter element 11 and the test chamber wall 16. In the case of a complete filter, where the filter element has been assembled into a can or enclosure, air and test agent enter the inlet, wherever it is located, by means of appropriate fixturing.

If the filter is not flawed, the larger particles of the agent do not pass inward through the filter element. If, however, there is a rejectable flaw in the filter, some or many of the larger particles pass through the flaw; and, along with the air flow through the whole filtering area, pass out of the filter element through the bottom outlet into the elbow 8.

Most of the one to two cubic centimeters of test agent remains on the exterior of the pleats 11 of the filter element or tends to fall to the bottom of the test chamber. The openings 9, described above, prevent an accumulation of test agent in the chamber, since it falls into the receptacle 61 below the mounting plate 4 and accumulates there. The removable lower part of the receptacle 61 permits the agent to be returned to the reservoir 28 for re-use.

The large elbow 8 carries the air flow and any passed large particles to enter a separating cyclone 48 tangentially at the top. The induced spin in the cyclone causes the particles (which have more mass than air) to seek the wall of the cylindrical space inside the cyclone as they descend, ending up rotating around the junction of the wall and the bottom. The air seeks the center; and, since most of it cannot escape at the bottom, turns upward and passes out to atmosphere through the relatively large central stack at the top. Since there is a pressure slightly above atmosphere in the cyclone from the resistance to the large flow through the slightly restricted exit stack, and because of the velocity pressure of the particles and the air in which they are suspended, they and a small flow of air escape through the small tangent tube 49.

Below this tube 49, inside a sealed enclosure 50 is an acoustic sensor 93. This device was developed by Gerhart Langer of the National center for Atmospheric Research, Boulder, Colo., under contract with the National Science Foundation. It was not patented. Original data on it may be obtained from papers published in the 1960's and early 1970's for upper atmosphere particle sensing. In the form employed here it is made of glass and is composed of 5 sections. The first section is a relatively large-diameter cylinder at the top. At the bottom, tube 54 is connected to a low-vacuum pump 85 (FIG. 2) through tube 54 and filter 84 (FIG. 2) protecting the pump, which causes air to flow into the top of the sensor at a rate greater than the air, containing the particles, flows from the tube 49 into it. The additional air drawn into the top of the sensor is allowed to enter the otherwise sealed enclosure 50 from atmosphere 97 (FIG. 2) via tube 55 from a filter 90 (FIG. 2) to exclude foreign atmospheric particles, and through a variable restriction 89 (FIG. 2) to produce the desired degree of slight vacuum in the enclosure, measured by a sensitive vacuum gauge 91 (FIG. 2) connected to tube 56. This slight vacuum helps the flow of particles and air from the cyclone 48 and yet is not enough to oppose appreciably the full flow of air into the sensor 93 on its way to the low-vacuum pump 85 (FIG. 2), allowing this higher flow to draw all the particles into the sensor. The small tube 49 from the cyclone 48 cannot be sealed to the sensor 93; first, because this would reduce the flow through the sensor, and second, because the connection would transmit excessive air-flow noise into the sensor to obscure the sounds of the particles being detected.

The second section of the sensor is a cone 59 leading the air flow smoothly into the third section of the sensor, a relatively small-diameter and long section 93 (the number 93 also designates the complete glass sensor) wherein the flow becomes laminar. The fourth section of the sensor is a cylinder 60, equal in diameter to the first section, with an abrupt change from the small-diameter third section 93. Here the flow again becomes turbulent with a sharp interface between the laminar and turbulent conditions. Many of the particles larger than 15 or 20 microns in size, particularly those which have traveled down near the wall of the small-diameter section 93, create a disturbence of the interface, creating a shock wave which travels back up the sensor and is heard as a sharp click in the vicinity. The fifth section of the sensor, the side tube 58, conducts this sound to microphone 51 which converts it to an electrical pulse to signal the passage of a large particle which has passed through the filter. The sensor will not produce this sound from particles less than about 15 microns in diameter, so that the small, harmless ones passing through a good filter will not affect the test. Nor would particles of dust of this small size, passing through the filter in service, damage the machine or device or space the filter is designed to protect. In the fourth section 60 of the sensor is a sponge 52 coarse enough to pass the particles, but fine enough to muffle the noise of the flow of air and the mechanical noise of the low-vacuum pump 85 (FIG. 2).

In the conventional electronic circuit, the electrical pulses from the microphone 51 are amplified and accumulated in a capacitor. If, within the predetermined test period of several seconds, enough particles of sufficient size have signaled their passage through the sensor; and, hence, a predetermined capacitor voltage is reached, a red "reject" light is displayed. If the test time elapses without that capacitor voltage being reached, a green "accept" light is displayed. The pulses from the microphone also are amplified and are reproduced at any desired volume with a speaker which gives an approximate audible measure of the size of the flaw or flaws. Further, a digital voltmeter or an electrical stop watch may be incorporated to produce a quantitative measure of the magnitude of the flaw or combination of flaws.

Figure 2:
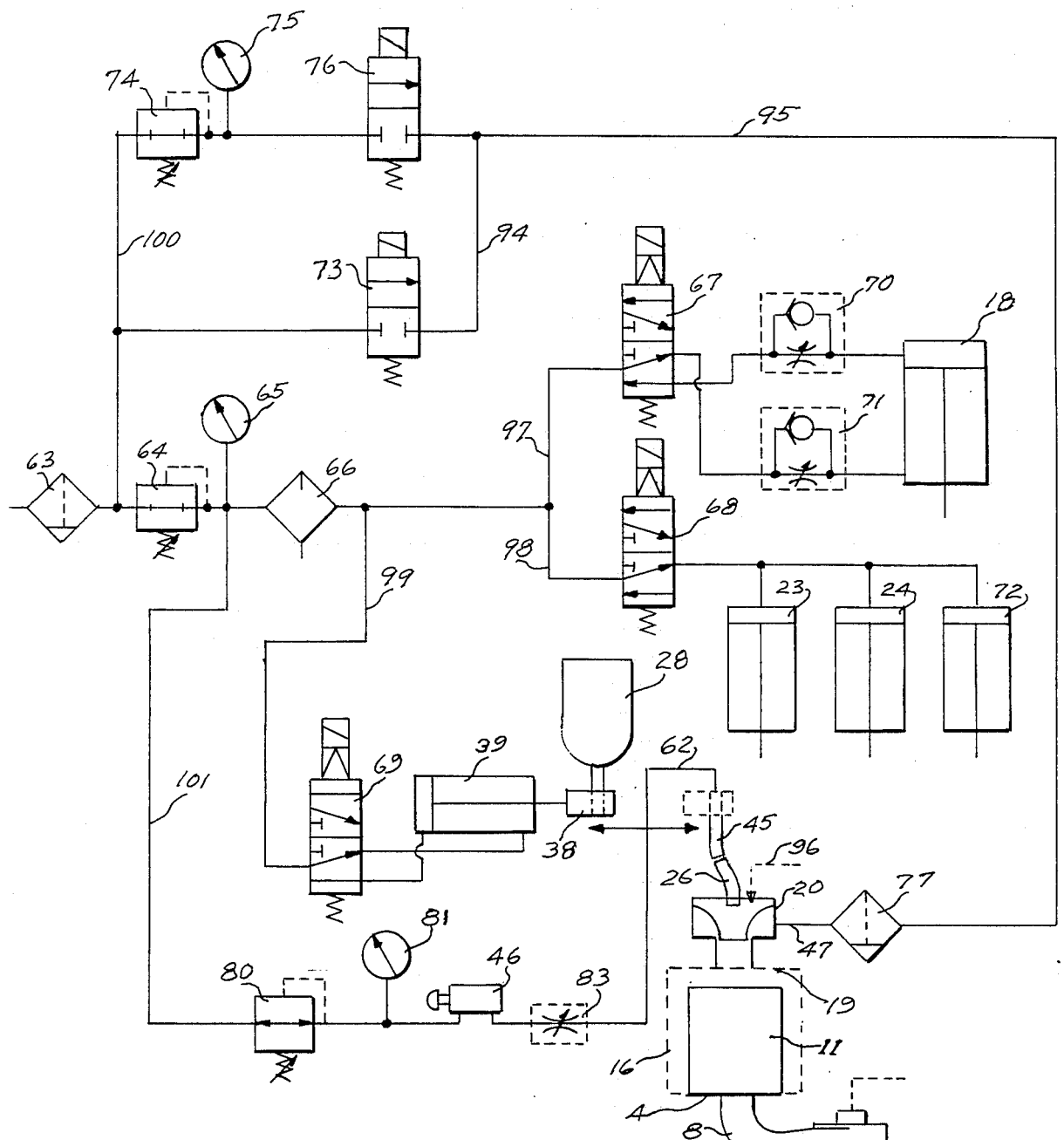
FIG. 2 is a schematic diagram of the pneumatic action of the apparatus.

Now refer to FIG. 2 of the drawings, a fluid schematic, which shows the action of air in the system.

Factory line air pressure, entering through filter 63, is reduced by pressure regulator 64 to the proper pressure, indicated by gauge 65, and entrains lubricant from oiler 66. This presure of air is conducted by conduits 97, 98, and 99 to 3 control valves 67, 68, and 69. Control valve 67 supplies air through speed-control valves 70 and 71 to each end of air cylinder 18 which lowers and raises the chamber enclosing the filter 11 on test. Control valve 68 supplies air to air cylinders 23, 24, and 72 which apply sealing pressure to the filter 11 on test, against gaskets 10 and 14 (FIG. 1). (Air cylinder 72, identical with cylinders 23 and 24 is hidden and does not show in FIG. 1). Line air pressure from filter 63 is also conducted by conduit 100 to control valve 73 and through regulator 74 to pressure gauge 75 and to control valve 76. From control valves 73 and 76, a common line 95 conducts air through filter 77 to transvector 20. These control valves permit applying two different pressures in sequence to the transvector, to cause the transvector to furnish the high purging flow to the system and then the lower testing flow. Control valve 69 supplies air in turn to the ends of air cylinder 39 which advances and retracts slider 38 (FIG. 1) to permit air from regulator 64, thrugh conduit 101, with further reduction through regulator 80, to reach pressure gauge 81, and limit valve 46; which, through throttling valve 83, supplies air to tube 62, ejecting the test particles from the measuring hole 94, (FIG. 1) in slider 38 through tube 45 and 26 into the atmospheric air stream 96 entering the transvector 20 for the test.

The air and test-agent particles enter the test chamber which encloses the filter 11 on test. Air and any large particles passing through the filter medium (such as the paper pleats) exit from the inside of the filter through large elbow 8, and enter the cyclone 48 where most of the air is separated out, the remaining air and particles then entering enclosure 50 by means of tube 49 from which they enter sensor 93. After the large particles have been sensed, the flow is conducted by tube 54 to the low-vacuum pump 85 through filter 84 which traps the particles, the air passing through the low-vacuum pump to atmosphere 102. A vacuum gauge 86 communicates with vacuum tube 54 through tube 92 to permit controlling the vacuum with throttling valve 88 supplying atmospheric air to tube 54. Most of the air entering the sensor to entrain the small flow of air and any particles through tube 49 from cyclone 48 enters the sealed enclosure 50 through tube 55 from throttling valve 89 and filter 90 from atmosphere. This prevents the air entering the sensor 93 on its way to the vacuum pump 85 from creating an excessive vacuum in the enclosure 50 which would prevent sensing of particles, and prevents any random particles from the environment from producing a false signal in the sensor. Throttling valve 89 controls the flow of atmospheric air to produce a slight vacuum in the sealed enclosure 50, the purpose of which is explained in connection with FIG. 1.

Included in the instrumentation are yellow "testing", green "accept" and red "reject" lights, and a loud speaker to hear the sound of the shock waves in the sensor. The sound is useful in maintaining and troubleshooting the apparatus, because the sum of the duration and intensity of the sound duplicates relatively the charge of the capacitor, independently.

The electrical and electronic control and readout system of the complete machine is not depicted nor described in the interest of avoiding undue complexity. The provision of the necessary transitors and other electrical devices will be within the skill of the mechanic to provide based on understanding of the foregoing description.

I have thus described a complete, integrated, semi-automated, high-production, 100%-inspection method and apparatus to permit culling from a production line the unavoidable percentage of filters containing unacceptable manufacturing flaws which would cause such filters to pass particles large enough to be harmful in the mechanism or device which the filters are designed to protect.

While this preferred embodiment of the invention describes a semi-automated apparatus, it should be understood that the invention includes machines with any desired degree of automation, from manual to those which carry out the inspection and separation of acceptable and unacceptable filters without an operator. Further, the invention includes applications of the basic method to other uses such as the inspection of filter paper and filter media of any type, and any industrial operation in which it is desired to disclose the passage of particles larger than 10 microns in size with a simple, rapid, reliable, easily-maintained-and-operated method and apparatus. For the foregoing reasons, I do not intend to limit myself otherwise than as specifically set forth in the claims.

What is claimed is:

1. A device for testing a filter for flaws, comprising:
   (a) a reservoir for containing test particles;
   (b) means for providing a stream of gas to said filter;
   (c) means for introducing a measured quantity of particles into said stream of gas from said reservoir;
   (d) means for collecting said gas and said test particles which pass through said filter, said collecting means including a cyclone having a lower exit tube and an upper stack opening greater than the diameter of said exit tube, whereby a large volume of the air which passes through said filter is releaseable through said stack opening, thereby concentrating said test particles in a much smaller air stream releaseable through said exit tube; and
   (e) acoustical sensor means for detecting the presence of said test particles, said sensor means including a shock wave generator, whereby when said test particles are introduced into said stream of gas, said test particles which pass through said filter are detected by said acoustical sensor means due to the shock wave each particle makes when said particle disturbs the interface between a section of the laminar flow and a section of turbulent flow of said acoustical sensor means.

2. The filter testing device of claim 1 wherein said acoustical sensor means comprises:
   (a) an acoustical particle counter constructed and arranged to receive air stream from the exit tube;
   (b) detection means connected to the acoustical particle counter for detecting said shock waves; and
   (c) indicating means connected to said detection means for indicating whether a filter is flawed or unflawed.

3. A method for testing a filter for potential flaws, comprising the steps of:
   (a) introducing a large volume of gas to said filter, said gas having entrained therein a small quantity of test particles containing at least some particles having a size which will not pass through an unflawed filter;
   (b) passing said large volume of gas through said filter, said gas entraining said test particles through any flaws in said filter;
   (c) separating said entrained test particles along with a small volume of said gas from the large volume of gas passed through said filter through a separator means, wherein said entrained test particles along with the small volume exit the separator means to the acoustical sensor means and said large volume of gas is released from the separator means to the atmosphere; and
   (d) passing said gas and any entrained test particles through an acoustical sensor means capable of detecting said entrained particles based upon shock waves produced by said entrained particles in said acoustical sensor means, said acoustical sensor means including an indicator means for indicating a flawed or unflawed filter based upon production of said shock waves.

4. The method according to claim 3 wherein said separator means comprises a cylindrical cyclone comprising:
   (a) an entry port along its upper outer cylindrical surface for receiving said gas and any entrained test particles from said filter;
   (b) an exit tube along its bottom outer cylindrical surface for directing any entrained test particles and small volume of gas to the acoustical sensor means; and
   (c) a stack on the top surface of said cyclone having an opening greater than the diameter and said exit tube for releasing said large volume of gas to the atmosphere.

* * * * *